United States Patent
Stoehr et al.

(10) Patent No.: US 10,520,917 B2
(45) Date of Patent: Dec. 31, 2019

(54) METHOD OF SIMULATING A SHAPING PROCESS

(71) Applicant: ENGEL AUSTRIA GmbH, Schwertberg (AT)

(72) Inventors: Anton Frederik Stoehr, St. Valentin (AT); Georg Pillwein, Linz (AT)

(73) Assignee: ENGEL AUSTRIA GmbH, Schwertberg (AT)

( * ) Notice: Subject to any disclaimer, the term of this patent is extended or adjusted under 35 U.S.C. 154(b) by 38 days.

(21) Appl. No.: 15/841,710

(22) Filed: Dec. 14, 2017

(65) Prior Publication Data

US 2018/0203431 A1    Jul. 19, 2018

(30) Foreign Application Priority Data

Dec. 23, 2016 (AT) .............................. A 51182/2016

(51) Int. Cl.
- G06F 19/00 (2018.01)
- G05B 19/406 (2006.01)
- B29C 45/76 (2006.01)

(52) U.S. Cl.
CPC .......... G05B 19/406 (2013.01); B29C 45/766 (2013.01); *B29C 2945/76913* (2013.01); *G05B 2219/31407* (2013.01)

(58) Field of Classification Search
CPC ..................................................... G06Q 10/06

(Continued)

(56) References Cited

U.S. PATENT DOCUMENTS 5,350,547 A * 9/1994 Yamaguchi ............. B29C 45/76
264/40.1
5,581,468 A 12/1996 White et al.
(Continued)

FOREIGN PATENT DOCUMENTS

DE  695 28 870  8/2003
DE  11 2011 103 778  8/2013
EP  1 218 163  11/2003

OTHER PUBLICATIONS

R. Zheng et al., "Injection Molding: Integration of Theory and Modeling Methods", Chapter 8: Computational Techniques, 2012, pp. 111-147.

(Continued)

*Primary Examiner* — Suresh Suryawanshi
(74) *Attorney, Agent, or Firm* — Wenderoth, Lind & Ponack, L.L.P.

(57) ABSTRACT

A method of simulating a shaping process involves calculating states of objects involved in the shaping process in discrete and successive time steps with presetting of conditions, and the conditions represent input parameters of the shaping process. After a time step which is before the end of the simulated shaping process, (a) a check on the calculated states of the objects involved in the shaping process is carried out based on a quality criterion. If the check in step (a) shows that the quality criterion is not met, then (b) at least one of the following is carried out: resumption of the simulation with repeated calculation of the time step and/or a preceding time step, and continuation of the simulation with calculation of a time step following the time step. When method step (b) is carried out, the conditions are at least partially altered.

23 Claims, 6 Drawing Sheets

(58) Field of Classification Search
USPC .......................................................... 700/117
See application file for complete search history.

(56) References Cited

U.S. PATENT DOCUMENTS

| | | | |
|---|---|---|---|
| 5,835,379 | A | 2/1998 | Nakano |
| 5,756,017 | A * | 5/1998 | Togawa ............. B29C 45/7693 |
| | | | 264/319 |
| 6,816,820 | B1 | 11/2004 | Friedl et al. |
| 7,758,780 | B2 * | 7/2010 | Cheng .................... B29C 45/77 |
| | | | 264/40.1 |
| 8,594,989 | B2 * | 11/2013 | Acar .................. G06F 17/5036 |
| | | | 703/13 |
| 8,855,804 | B2 | 10/2014 | Hazen et al. |
| 9,138,929 | B2 * | 9/2015 | Heitzer ............. B29C 45/7693 |
| 2004/0093104 | A1 | 5/2004 | Kaneto et al. |
| 2004/0230411 | A1 * | 11/2004 | Zheng ............... B29C 45/7693 |
| | | | 703/6 |
| 2005/0114104 | A1 | 5/2005 | Friedl et al. |
| 2008/0294402 | A1 | 11/2008 | Moroni |
| 2009/0037013 | A1 | 2/2009 | Hendler et al. |
| 2010/0057237 | A1 | 3/2010 | Kettaneh et al. |
| 2012/0123583 | A1 | 5/2012 | Hazen et al. |
| 2014/0217633 | A1 * | 8/2014 | Raschke ............... B29C 35/007 |
| | | | 264/40.6 |
| 2016/0229101 | A1 * | 8/2016 | Schiffers ................ B29C 45/26 |

OTHER PUBLICATIONS

H. Zhou et al., "Computer Modeling for Injection Molding", Part II: Simulation, Mathematical Models for the Filling and Packing Simulation, 2013, pp. 49-254.
Yi Yang et al., "Online quality optimization of the injection molding process via digital image processing and model-free optimization", Journal of Materials Processing Technology, 226 (2015), pp. 85-98.
C.S. Krishnamoorthy et al., "Artificial Intelligence and Expert Systems for Engineers", CRC Press, 1996, pp. 29-88.
A. Schötz, "*Abmusterung von Spritzgießwerkzeugen*", München: Karl Hanser Verlag, pp. 31-220.
C. Jaroschek, "*Spritzgießen für Praktiker*", Edition 3, München: Karl Hanser Verlag, pp. 31-98.
B. Fein, "*Optimierung von Kunststoff-Spritzgießprozessen*", Edition 2, Berlin: Beuth Verlag GmbH, pp. 65-120.
Kunststoff-Institut Lüdenscheid, "*Störungsratgeber*", Edition 12, Unna: Horschler Verlagsgesellschaft GmbH, pp. 6-178.

* cited by examiner

METHOD OF SIMULATING A SHAPING PROCESS

BACKGROUND OF THE INVENTION

The present invention concerns a method of simulating a shaping process or a sub-process of the shaping process.

States of objects involved in the shaping process, in particular a shaping machine, a shaping tool, and/or a material to be processed, are calculated in discrete and successive time steps with presetting of conditions, wherein the conditions represent input parameters of the shaping process.

Shaping machines are, for example, injection molding machines, injection presses, presses and the like. Shaping processes similarly follow that terminology.

The conditions represent the input parameters to the effect that they are the mathematical counterparts to the input parameters which are set for example by operators at the shaping machine. For example, in an injection molding process, input parameters could be parameters in relation to an injection profile. In the simulation then, for example, the machine elements which implement the injection profile could be simulated in detailed fashion. The parameters in relation to the injection profile then clearly establish the conditions which arise out of the parameters to the simulation. Instead of such an identical establishment of the conditions the conditions of the simulation can also be adapted to the input parameters by modeling of the actual facts. In the previous example with the injection profile that could be a time-dependent mass flow in the sprue. That is, of course, to be viewed purely by way of example. A similar situation applies for all input parameters or conditions.

The input parameters concern predominantly the motion and force profiles of drives of the shaping machine and other components of the shaping machine, that are to be controlled. Taking the example of an injection molding machine, those components would be, for example, drives for opening and closing a mold tool, producing a closing force, injection, post-pressure, ejector, heating means and so forth.

Hereinafter, the state of the art is described by reference to the example of injection molding machines (IMM). The conclusions also similarly apply to other shaping processes (injection molding processes are abbreviated as IM processes).

Simulations by means of finite element methods are highly processing-intensive and therefore require particularly powerful computing systems or a great deal of time. Depending on the duration and time discretization of the IM process or the magnitude and the spatial discretization of the geometries to be simulated, processing times of between some hours and several days are to be expected per filling operation on commercially usual computers.

Optimization tasks generally require implementation of a relatively large number of individual simulations. In order to arrive at a result in the optimization procedure as quickly as possible in a given computing system methods are necessary for very substantially reducing the computing involvement.

In practice, methods of statistical experiment planning (English: Design of Experiments—DoE) have become established. With a given number of parameters to be investigated, the methods serve to reduce the number of necessary experiments to such an extent that relevant interactions between the parameters and quality features can nonetheless be ascertained as accurately as possible.

Injection Molding Simulations

Numerical flow mechanics (computational fluid dynamics—CFD) can be used to simulate injection molding processes. In that respect, various kinds of filling simulations are in circulation (see Zheng R., Tanner R. I., Fan X.-J. (2012): *Injection Molding*. Heidelberg: Springer. Pages 111-147; Zhou H. (editor) (2013): *Computer Modeling for Injection Molding*. Hoboken: Wiley. Pages 49-254). They basically differ in their structure and the physics which they cover. Simulations commonly involve spatial and temporal discretization. In general, the fineness of the discretization determines the accuracy of the results and at the same time the required computing resources (size of the computing system and duration of the calculations).

A given product, that is to say the cavity of an injection molding tool, mostly occurs as CAD data. That CAD geometry is divided up into small units (spatial discretization). In 3D the units frequently correspond to hexahedrons or tetrahedrons. Various states are calculated in the simulation for those units, more specifically piecewise in small time units (temporal discretization). Various equations are solved in each time unit, for example the continuity equation or the Navier-Stokes equation. Process variables of the modeled plastic like for example its temperature, pressure or density can correspond to the states.

The full 3D model gives the most accurate results, but is also the most time-intensive and processing-intensive. Simplifications to the full 3D model form the Hele-Shaw model (the geometry is described by a plane, to each location of which a wall thickness is attributed), the 2.5D model or the dual-domain model.

Particularly in connection with full 3D models, the spatial discretization per se does not have to be static but can also change with the progression in the simulation (adaptive grid definition). In that way, the computing accuracy can possibly be increased and the computing time possibly reduced.

Temporal discretization typically arises out of establishing a so-called courant number Co which specifies by how many cells a variable (typically the plastic mass) advances at a maximum per time step. An individual time step or calculation step therefore involves in the process a corresponding duration (for example 10 µs<$\Delta t$ <10 ms) and that process duration is generally different for each time step. Accordingly, temporal discretization is conditioned by the respective cell sizes, the respective flow speeds and the defined courant number. That can be a number between 0 and 1 ($0<Co<1$) or once again a function $0<Co(x)<1$, wherein x denotes most widely varying dependencies (time, location, pressure, combinations and so forth).

The higher the degree of spatial discretization (the respectively smaller the cells), the higher the flow speeds and the lower the courant number, the correspondingly less is the process duration being implemented in a respective calculation step. The smaller the respective process durations of the respective calculation steps, the correspondingly more calculation steps are required to conclude a filling operation. The computing resources for a calculation step are approximately independent of the respective process duration. Accordingly, the computing resources required in total rise with a higher degree of spatial and temporal discretization.

Enlarged Injection Molding Simulations

The geometry of the cavity can be enlarged by that of the nozzle, the hot runner system, the distributor, the screw pre-chamber and so forth. Many simulations also take account of the complete tool and the temperature conditioning passages disposed therein.

The depicted physics in the simulation can also include crystallization of polymers, or orientation and thermal damage to fillers. Heat transfer, shearing speed- and pressure-dependent viscosity, shearing heating, freezing of edge layers and so forth also play a part. Then or parallel to filling/injection molding simulations it is also usual to carry out temperature conditioning, cooling, distortion or shrinkage analysis operations.

Simulations for Process Optimization

Injection molding simulations are typically used in tool construction for the following tasks: determining orientation of fibers; avoiding weld seams; determining the necessary closing force; dimensioning wall thicknesses; optimizing position, number and size of gatings; minimizing distortion; determining demoldability; avoiding hotspots; calculating the filling time; determining shrinkage; determining sink marks; avoiding venting problems; and determining internal stresses.

In the meantime, the complicated and expensive but accurate 3D-FEM simulations are also being used for realistic calculation of the injection molding process in order moreover to permit offline optimization of conditions or the machine setting (input parameters). In that respect, the filling speed/filling time, melt or tool temperatures or the post-pressure level are to be optimized. Higher-order optimization aims are a robust injection molding process, a short cycle time or a molding surface without defects like for example sink marks, streaks or burns.

For optimization purposes, statistical experiment planning (English: Design of Experiments—DoE) is used in practice. For DoE, the operator of a simulation software normally (manually) defines a parameter range comprising parameters to be varied (factors) and associated parameter values (levels). The data or results of each filling simulation are analyzed. Required for that purpose are suitable quality functions which depict the results of the simulations on quality variables or make quality-deciding molding or process properties from simulated quantities.

In order to acquire maximum information about the influences and the relationships between the various parameters and to achieve the optimization aims in the best possible fashion, the parameter range should be as large as possible and as far as possible and each combination of parameter values should be analyzed. Obviously, the number of required filling simulations can very easily become very high. Therefore, the number of necessary runs is normally cleverly limited at the expense of the information obtained. Nonetheless, the required simulation involvement remains considerable.

According to the state of the art, multiple simulations are carried out in accordance with the experiment design set up. The results are respectively analyzed and the relationships between the various parameters and the quality functions are modeled. A (local/provisional) optimum can then be determined. If necessary, or if the required quality criteria could no longer be met within the parameter range covered, new/other parameter ranges are used in further iterations. That lifts it to an "optimum".

Various supporting/alternative algorithms were devised in the literature and vividly summarized by Yang et al 2015 in FIG. 1 (reproduced in adapted form) (see Yi Yang, Bo Yang, Shengqiang Zhu, Xi Chen. Online quality optimization of the injection molding process via digital image processing and model-free optimization. Journal of Materials Processing Technology 226 (2015) 85-98). For the present invention, it is primarily that identified as "offline" and specifically the use of "first principle models", that is relevant. A combination and alternate use of other methods is however certainly possible.

Following the various simulations or first principle models, CFD- and FEM-calculations and so forth, the results thereof are analyzed. After implementation and analysis of a (one-factor-at-a-time) simulation or a plurality of (DoE) simulations, a check is made as to whether the quality criteria are met and in turn that is followed by the decision as to whether and which parameters can/are to be possibly modified in a further iteration. That procedure in the state of the art is illustrated in FIG. 2 from EP 1 218 163 B1.

A flow chart of offline process optimization by injection molding simulations (CFD) in accordance with the state of the art is shown in FIG. 3. The expert knowledge is present in the form of knowledge of an operator and the inputs thereof. The assessment of a simulation is effected, as mentioned, after the end thereof, followed by a check as to whether the results correspond to the quality requirements. Parameters or conditions are possibly modified and a further simulation is carried out.

A process which is improved over that procedure is state of the art and is shown in FIG. 4. Instead of iteratively modifying the parameters or conditions, with the aim of achieving optimum simulation results, an experiment plan (DoE) is prepared. That is processed, each of the simulation results is assessed, possibly modeling is effected and an optimum is identified. Optionally that procedure can be combined with the above "iterative optimizer" (FIG. 3).

For example EP 1 218 163 A1 or US 2008 0294402 disclose methods of the general kind set forth for the simulation of an injection molding process.

SUMMARY OF THE INVENTION

The object of the invention is to provide a method of simulating a shaping process, which allows more effective management with computing power.

That object is effected in that:

(a) after a time step which is before the end of the simulated shaping process or the sub-process of the shaping process, a check on the calculated states of the objects involved in the shaping process is carried out on the basis of at least one quality criterion, (b) if the check in step (a) shows that the at least one quality criterion is not met at least one of the following is carried out:
 (i) resumption of the simulation with repeated calculation of the time step and/or a preceding time step,
 (ii) continuation of the simulation with calculation of a time step following the time step, (c) wherein, when method step (b) is carried out, the conditions are at least partially altered.

Upon resumption of the simulation in accordance with (b)(i), it is possible to continue both with the very first time step and also with a later time step which has already been calculated once.

As mentioned, the input parameters predominantly concern the motion and force profiles of drives of the shaping machine and other components of the shaping machine, that are to be controlled. For example, the change of an entire shaping machine or a mold tool is effectively not possible for operators when setting up the shaping process.

The invention provides for checking the quality criterion—preferably by applying a quality functional to the calculated data or states. For that purpose, it is firstly to be noted that the quality criterion does not have to be related to the molding produced in the shaping process (dimensional accuracy, distortion, surface nature). The quality criterion can—and in many cases will—also concern certain properties of the shaping process (certain pressures and temperatures and so forth).

According to the invention, the check in accordance with method step (a) is to be carried out before the end of the simulated shaping process or the simulated sub-process. While "entire simulations" were carried out in the state of the art, therefore, the invention does not wait for the end of the physical process being considered.

An "entire simulation" is moreover to be viewed as "time-entire and space-entire". In other words, after the "entire simulation" the physical process being considered is concluded.

By way of example, a (virtual) plastic melt can be in a state in which it could be "removed", that is to say at least the edge layers thereof are set or are below a certain temperature.

Admittedly in the state of the art there are situations in which simulations are aborted. For example, a simulation may be stopped if it should turn out that the flow front has frozen before the tool cavity is full (whereby full filling becomes impossible). The physical process or the shaping process or the sub-process thereof is, however, also terminated here. Ultimately, this involves a programming safety measure. In accordance with the development referred to, however, a check is made to ascertain whether the (physical) shaping process develops as desired.

In many cases therefore the invention makes it possible to make a modification to the conditions (input parameters) without going back again completely to the beginning of the simulation and starting from the beginning.

An advantage of the invention lies in eliminating the problem that, in the case of an "entire simulation", the conditions or the time progression thereof are defined from the outset. Those defined conditions (in the case of an injection molding process for example the injection or the post-pressure profile) accompany the simulation from the start thereof to its end and cannot therefore be modified during the simulation. That limitation is removed by the invention.

The operation of carrying out virtual/offline process optimization procedures by injection molding simulations according to the state of the art is very time-, computing- and resources-intensive. In comparison, the development of the invention makes it possible that
- It is possible to establish before the end of the complete simulation that various quality criteria are not met under the given conditions, and
- It is possible for conditions to be modified before the end of the complete simulation that various quality criteria are met.

According to the invention, the success of a simulation-supported optimization becomes independent of the skill of the operator of the respective simulation software because he no longer has to manually predetermine the parameters to be varied and the factors thereof—practically the entire experiment plan of a DoE—but must himself decide when the results of the modeling are sufficient, and possibly has to decide himself about carrying out a further different test sequence (using DoE). That avoided the point that even after carrying out N DoEs, it was still not possible to identify conditions (for example injection profile, post-pressure profile) which supply results of adequate quality (in regard to aesthetics, dimensional accuracy, optical aspects, mechanics, economy, process stability and so forth), which can certainly occur in methods in the state of the art.

Input parameters can be process parameters. Process parameters, however, may be not only those parameters which are input at the shaping machine, but ultimately any physical values involved in the shaping process.

The invention can be applied to molding processes, in particular to filling simulations in relation to injection molding processes, which can then serve to find machine settings with which products of adequate quality can be produced. The invention can be used in particular for determining tool internal pressures or flow front progressions which are as optimum as possible (for example a filling front speed which is as constant as possible).

According to the invention, it is possible in that respect to manage as efficiently as possible with computing resources/computer resources (by reduction in the necessary simulation steps and the time advantage that this entails).

The invention can be used with the following simulation methods (and combinations thereof): the finite element method (FEM), the finite difference method, the finite volume method, the Hele-Shaw formalismus, the 2.5D midplane analysis, dual-domain analysis, similar simulation methods, an injection molding simulation coupled to a machine simulation, an injection molding overall simulation with the support of known optimization methods and/or preprogrammed expert knowledge.

The invention permits an inclusion of optimization within the simulation procedure and incremental generation for example of injection and post-pressure profiles (or all process settings which are required in a shaping process).

The check on the calculated states on the basis of the at least one quality criterion can be carried out by applying at least one quality functional to the calculated states.

Steps (a) through (c) can be carried out a plurality of times in the context of the simulation of a shaping process or the sub-process of the shaping process.

Method step (b) can be carried out in automated fashion.

The simulation can be subdivided into calculation phases, wherein the calculation phases respectively include a plurality of time steps.

The sub-process of the shaping process and/or the calculation phases can be respectively given by a start time and an end time.

In the simulation of an injection molding process (as a shaping process), the start time and/or the end time of the sub-process and/or of the calculation phases can be given by at least one of the following:
- beginning and/or end of a plasticization operation (converting the solid or highly viscous plastic (solid) into a fluid or low-viscosity plastic (melt)),
- beginning and/or end of a compression relief (return of the screw after plasticization so that the pressure of the melt in the screw pre-chamber is reduced),
- beginning and/or end of the flow of a plastic melt from a screw pre-chamber in the direction of a tool cavity (compression of the melt in the screw pre-chamber, forward motion of the screw, entry of the melt into the nozzle, start of injection),
- beginning and/or end of a flow of a plastic melt into the tool cavity (first significant rise in pressure),
- reaching a predetermined filling degree of a tool cavity (for example a filling degree of 80%, 90%, 95% or 99%),
- beginning and/or end of a compression phase (in the compression phase a melt is in a state in which the plastic material is for the major part only more compressed), reaching a sealing point (that time at which the gate (connection cavity–sprue system/nozzle) freezes so that scarcely any more plastic flows into the cavity), reaching a switching-over point, beginning and/or end of a post-pressure phase, edge layers of a molded part are hardened to such an extent that the molded part is substantially stable in shape (also referred to as the "end of the cooling time"), beginning and/or end of a tool opening movement (removal of the at least partially set injection article/molding from the mold cavity can then be effected), and beginning and/or end of a formative phase.

The start time and/or end time of the calculation phases can be established by the passage of a filling front at predetermined spatial points of a tool cavity. (In the simulation those criteria can be checked for example by a status functional.) The start time and/or the end time can be established manually or automatically.

At least two of the calculation phases can be sequentially linked, wherein results of a previous calculation phase are used as initial states of a following calculation phase. The conditions of a first calculation phase can in that case be defined automatically by an initiation system or manually by an operator (see FIG. 11).

Various process models and/or calculation methods can be used for different calculation phases.

In that respect it is possible to distinguish for example an injection phase and a post-pressure phase which are optimized separately from each other in different ways and using different calculation methods.

At least one reference progression is predetermined for progressions of states calculated in the simulation. The reference progressions can concern for example pressures, temperatures, shearing, flow speeds of a plasticized plastic (in an injection molding process).

In the context of applying the quality functional, a comparison can be carried out between the at least one reference progression and at least one progression calculated in the simulation. Preferably, a difference is quantitatively detected between the at least one reference progression and the at least one progression calculated in the simulation.

The reference progressions can be calculated in advance—preferably using an expert system. The reference progressions, however, can also be predetermined by an operator.

An expert system in the sense involved here can be interpreted as an intelligent databank integrated into a computing system (see for example Krishnamoorthy, C. S. and S. Rajeev (1996): Artificial Intelligence and Expert Systems for Engineers, Boca Raton: CRC Press, pages 29-88). It involves systematized and programmed-in basic knowledge about the rules of the shaping process as can be found for example from pertinent literature (see Schötz, A. (2013): *Abmusterung von Spritzgiesswerkzeugen*, Munich: Karl Hanser Verlag, pages 31-220; Jaroschek, C. (2013): *Spritzgiessen für Praktiker*, 3rd edition, Munich: Karl Hanser Verlag, pages 31-98; Fein, B. (2013): *Optimierung von Kunststoff-Spritzgiesswerkzeugen*, Munich 2nd edition, Berlin: Beuth Verlag GmbH, pages 65-120; Kunststoff-lnstitut Lüdenscheid (2013): *Störungsratgeber*, 12th edition, Unna: Horschler Verlagsgesellschaft GmbH, pages 6-178). In addition, rules can be programmed into an expert system, which represent generalizations of procedures for machine setting, error detection or error avoidance by experienced process technicians and specialists for setting shaping machines. Such a set of rules or basic knowledge can occur for example in the form of truth functions or conversion tables. An expert system, in relation to known shaped component geometries, materials, machines and quality requirements, on the basis of the programmed knowledge and the rules, can make rough estimates about ranges of input parameters which result in successful machine settings. On the basis of programmed relationships between input parameters, machine settings, shaped component properties and material properties it is possible subsequent to an establishment of quality criteria which are not met, with previously used input parameters, to carry out necessary modifications to the input parameters.

In calculating the reference progressions, the following can be performed:

(A) calculating a desired filling pressure at a point of a gate on the basis of a maximum flow path and an average flow cross-section, and (B) determining a linear progression in a pressure from the beginning of an injection operation to the calculated filling pressure at complete filling of the tool cavity.

Simulation of the shaping process and/or the sub-process of the shaping process and/or the calculation phases is subdivided into sub-calculation phases, wherein (a) through (c) are carried out after each sub-calculation phase.

The conditions after each sub-calculation phase are subjected to an optimization method, and the optimization method is preferably adapted to:

adapt progressions of calculated states to the predetermined reference configurations and/or to so alter the conditions that calculated states of objects involved in the shaping process meet the at least one quality criterion.

If a plurality of quality criteria are used they can be weighted according to their importance for the shaping process. In addition, by means of multi-criterial optimization, it is possible to find an improved set of conditions for resumption or continuation of the simulation.

The start and the end of a calculation phase and/or a sub-calculation phase or the number of computing steps within a respective sub-calculation phase can be defined by applying "status functionals" to at least parts of previous process data or calculated states (see FIG. 9) which for example analyze in automated fashion whether the filling front has passed a certain point of a molding tool geometry.

When changing the conditions in accordance with (c), an expert system can be used, which is preferably employed for working out a statistical experiment plan.

The input parameters represented by the conditions of the simulation are transmitted to an injection molding machine after implementation of the simulation and are used in a real shaping process.

After the simulation of the shaping process is carried out, results of the simulation are stored in a databank. The databank preferably additionally contains corresponding process data from real shaping processes and the real process data are correlated with the results of the simulation.

BRIEF DESCRIPTION OF THE DRAWINGS

In the two following, embodiments by way of example relating to injection molding processes reference are described with reference to the Figures, in which.

DETAILED DESCRIPTION OF THE INVENTION

Embodiment 1

Optimizer based on FEM simulations using assessments of individual simulations before they are yet concluded.

A simulation to be carried out is not assessed only after the conclusion of the simulated shaping process (or sub-process) on the basis of the quality criteria, but is already assessed during same at regular time intervals. In that way, problems in the process which lead to the conclusion that the conditions used in the simulation are unsuccessful can be detected before the simulation is yet concluded. The simulation can therefore be prematurely aborted and the next one can be started.

Figure 10:
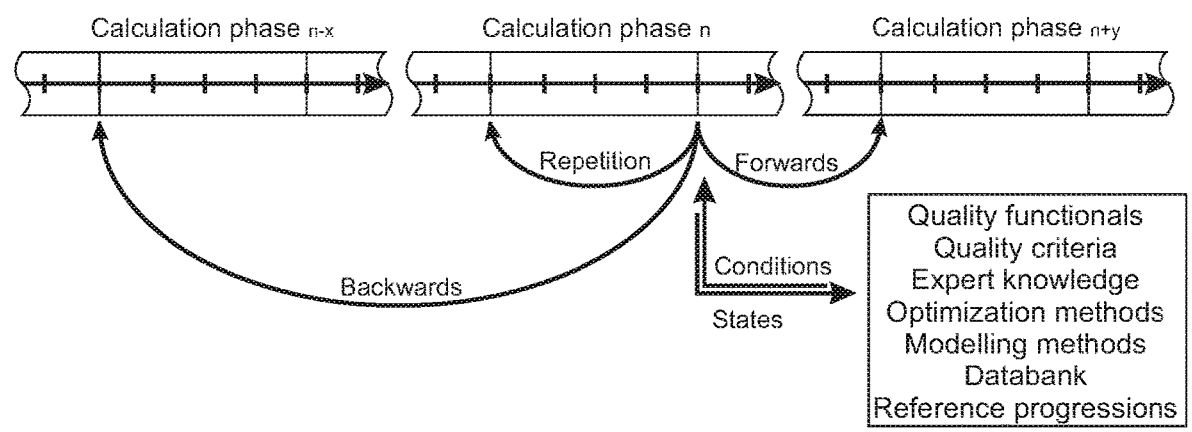
Figure 12:
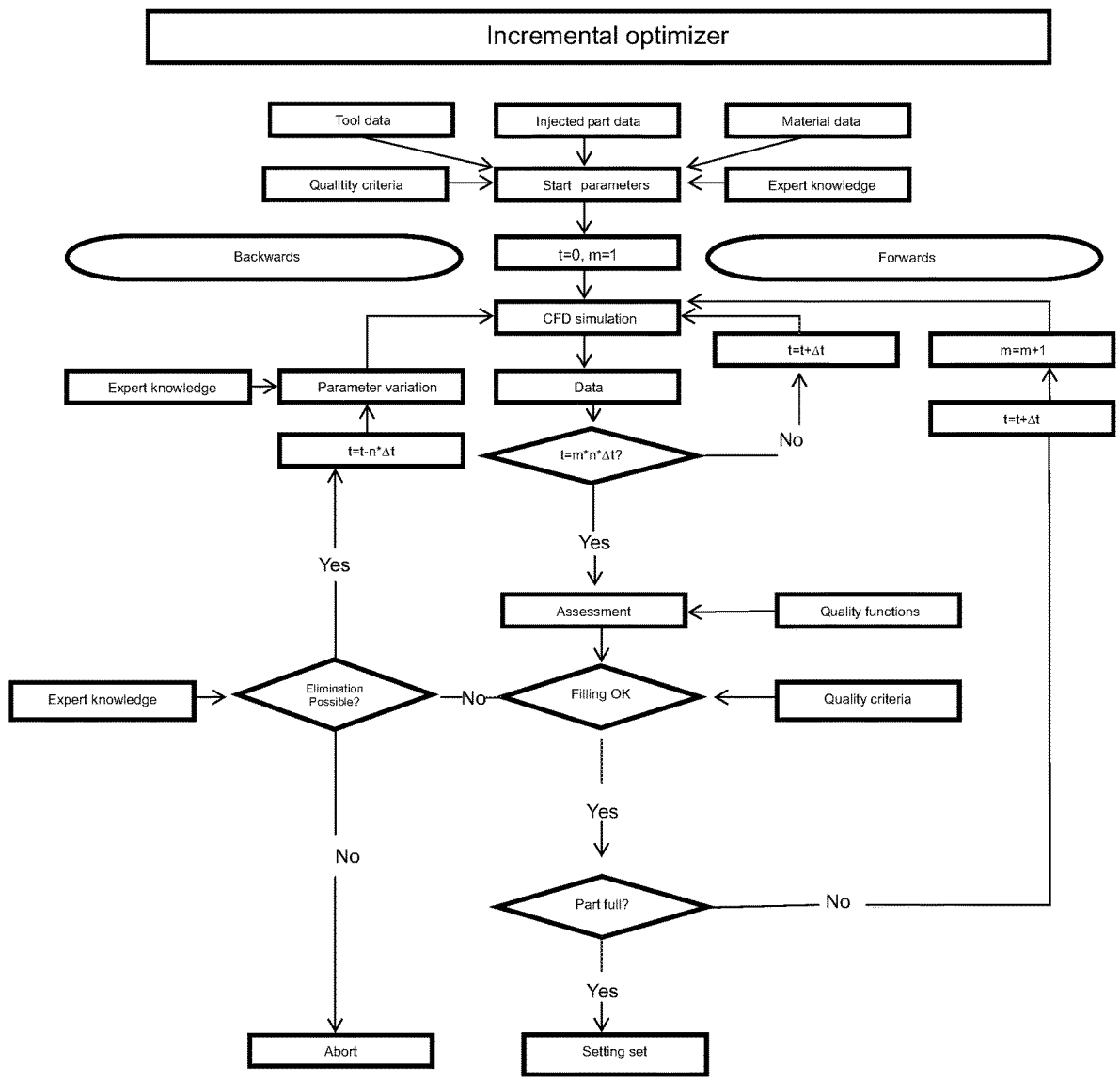

By virtue of the time discretization, it is possible in the simulation for any steps to be jumped backwards to a time where it is expected that, with a given change in the conditions and simulation once again, the problem addressed can be solved from that time (see FIG. 10 and FIG. 12). If not, it would be possible in a further iterization to try to vary other conditions or to go further back in time and try it once again.

Obviously, fresh problems occur and the process can be aborted in accordance with programmed rules, whereupon a completely fresh simulation is begun within a previously defined parameter range. If the problem is overcome, then a complete simulation is carried out with the altered conditions.

The general idea is that an optimization program, besides the actual simulation program, "manages" the simulation and continuously learns or in each step generates information about the filling, pressure and temperature characteristics of the IM process, which serves the optimizer program to set fresh steps in the simulation in order to meet all quality criteria as best possible and to deliver a suitable machine setting set (input parameters).

As an additional measure, it is possible to employ an optimizer based on FEM simulations, using experiment planning and restricting the parameter range, employing programmed expert knowledge (expert system).

In order further to reduce the necessary computing resources, it is advisable for the number of simulations to be limited once again on the basis of expert knowledge. Thus, it may be, for example, appropriate not to carry out many experiments because it is known beforehand that they fail. For example, it may be appropriate to vary the temperature of the plastic melt and the injection speed in certain ranges, but suspecting that the combination of a low temperature and low injection speed leads to incomplete filling. Experience collected in experiments could therefore be implemented in the program for optimization so that simulations with few prospects of success are automatically skipped.

As a further additional measure, it is possible to employ an optimizer based on FEM simulations using experiment planning and programmed expert knowledge (expert system), wherein parameter areas which are less auspicious are excluded in the course of handling a parameter range.

An experiment plan can also be carried out in such a sequence that a certain parameter range can be excluded at an early time. For that purpose the individual simulations must be assessed directly following same on the basis of quality criteria. On the basis of pre-programmed expert knowledge each simulation is followed only by those which were adjudged as less likely to succeed by virtue of previous simulations and the applied expert knowledge.

Aims of the optimization method:
Reaching complete filling at minimum speeds and minimum temperatures,
Reaching a minimum band width in respect of temperature distribution (at the end of filling),
Reaching an ideal pressure variation in respect of the individual volume elements,
Reaching a constant flow speed,
Reaching a maximum injection speed profile which is steady/smooth and does not result in material damage or does not exceed similar limits,
Adapting the positions and diameters of the temperature control passages so that a uniform mold removal temperature is reached, and
Adapting the through-flow amounts and media temperatures in the individual temperature control passages so that a uniform mold removal temperature is reached.

Figure 1:
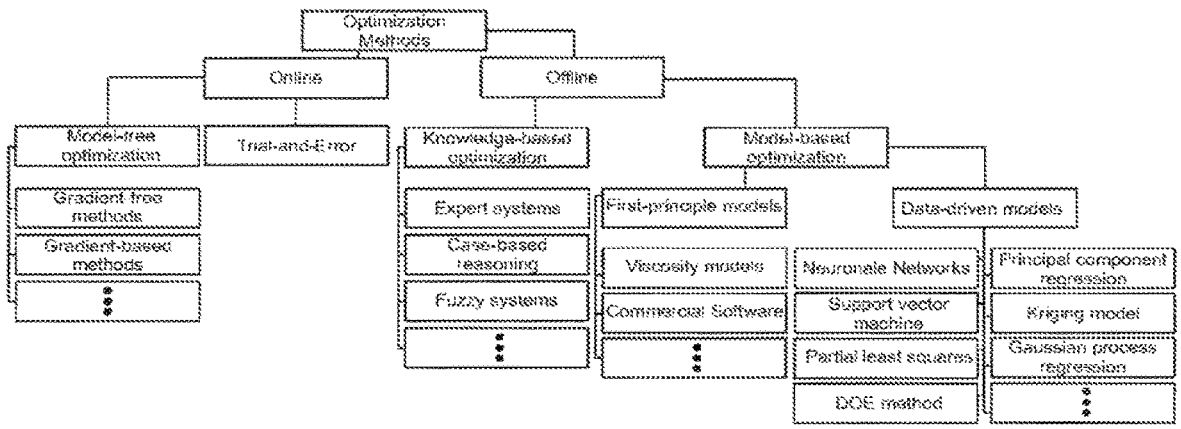
FIGS. 1 through 4 and 7 show flow charts relating to simulation processes in accordance with the state of the art.
Figure 2:
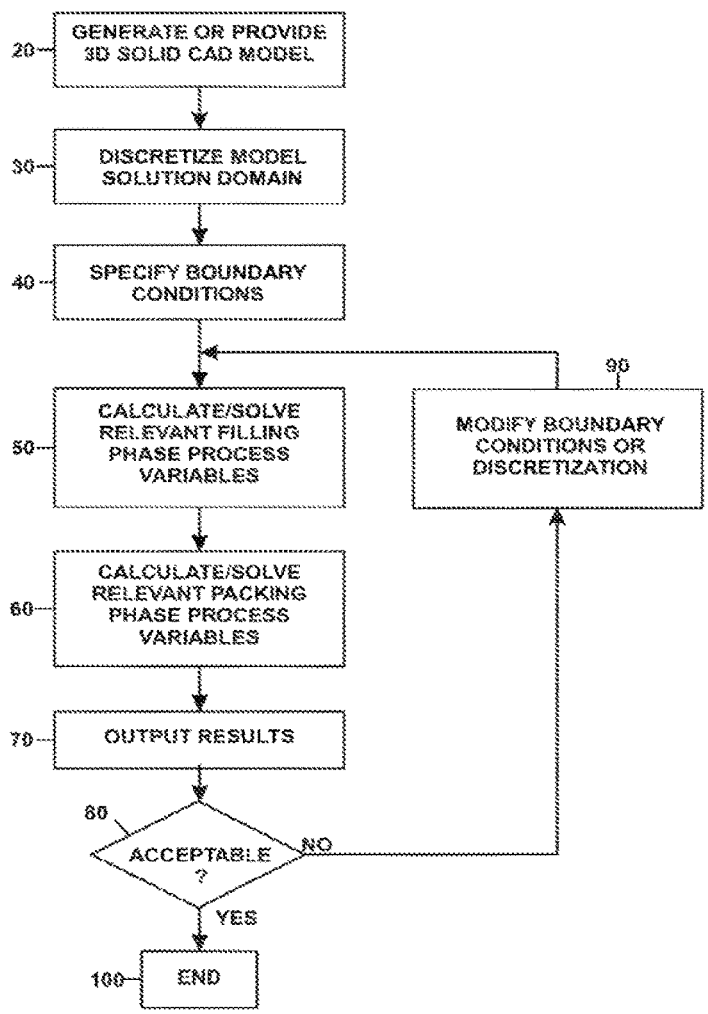
Figure 3:
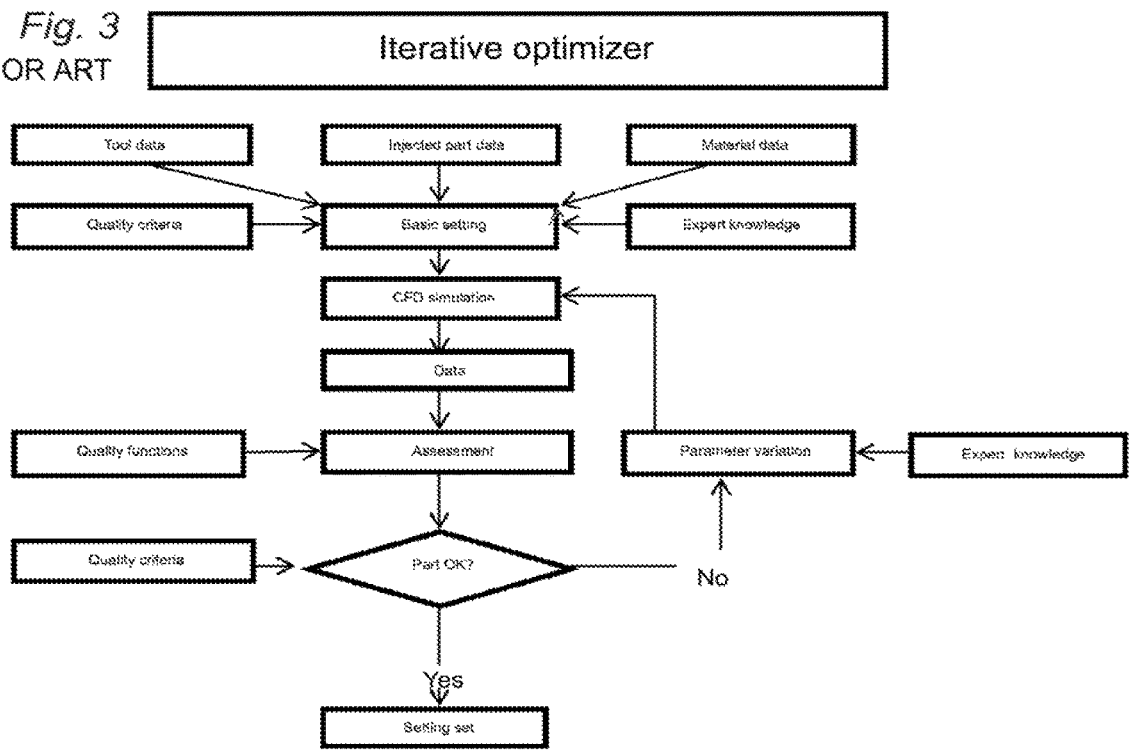
Figure 4:
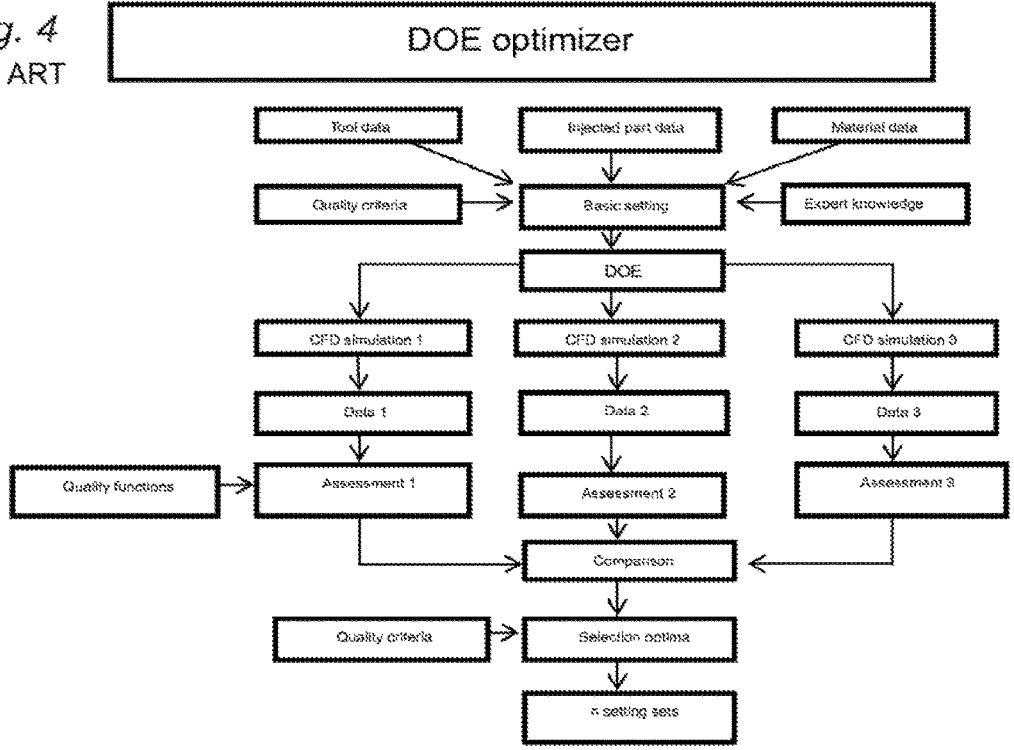
Figure 5:
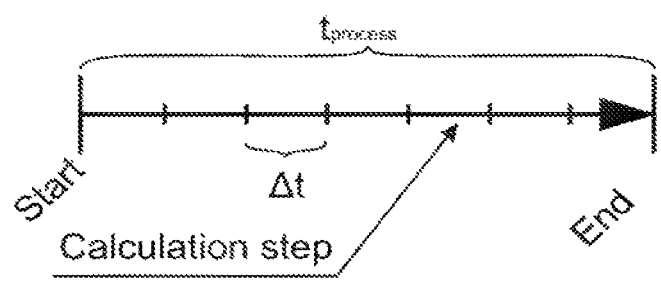
FIGS. 5, 6 and 8 through 12 show flow charts relating to examples of further methods according to the invention.

FIG. 5: A calculation in the sense according to the invention involves a shaping process or physical procedure (for example a sub-process of the shaping process) which is characterised by a start and an end. Accordingly, a certain duration $t_{process}$ can be associated with the process to be simulated, which duration is not yet known per se at the start of the simulation but generally arises out of the moment in time at which the process to be simulated is concluded. For example, the start corresponds to the entry of a plastic melt into a cavity and the end corresponds to complete filling of the cavity, thereby giving the so-called filling time as the duration. For an iterative calculation like, for example, for a simulation using the finite element method the process duration is calculated stepwise. A total consisting of N calculation steps (time steps) accordingly gives the total calculation. Each time step involves a partial duration $\Delta t$ which can also be variable.

Figure 6:
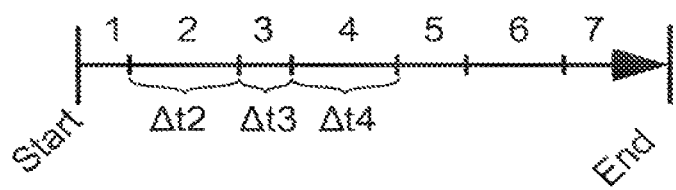

FIG. 6: The number N of necessary time steps and the respective durations thereof generally derive from the course of the results of the individual time steps and the courant number Co. The courant number does not necessarily have to be constant. In general the respective time steps can be of differing length.

Figure 7:
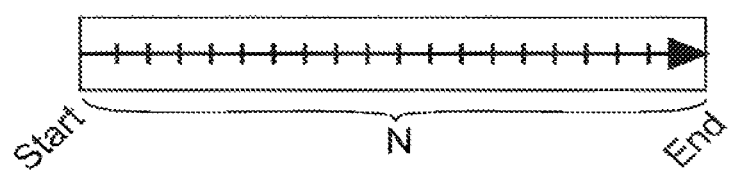

FIG. 7: Simulation methods according to the state of the art. A simulation is generally carried out from the start to the end of the physical process which is simulated. Results are first analyzed at the end of the simulation and possibly the entire calculation is repeated by (generally manually) modified conditions.

Figure 8:
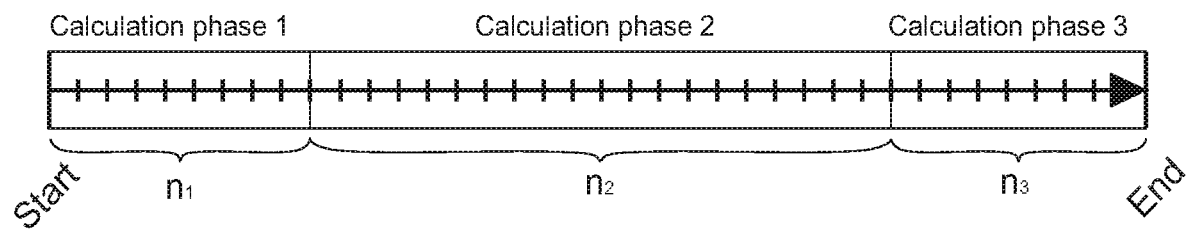

FIG. 8: Simulation methods according to the invention whereby an overall calculation is divided into M calculation phases, each of which consists of N time steps. The number M is not necessarily defined at the start of the simulation, but generally rather results from the course of the results of the individual time steps. Similarly, the process duration $t_{process, m}$ and the number of time steps $N_m$ of the calculation phase m is not defined at the beginning thereof, but generally rather results from the course of the results of the individual time steps. The start and the end of the respective calculation phases, apart from the start of the first calculation phase M=1, are also not defined beforehand.

Figure 9:
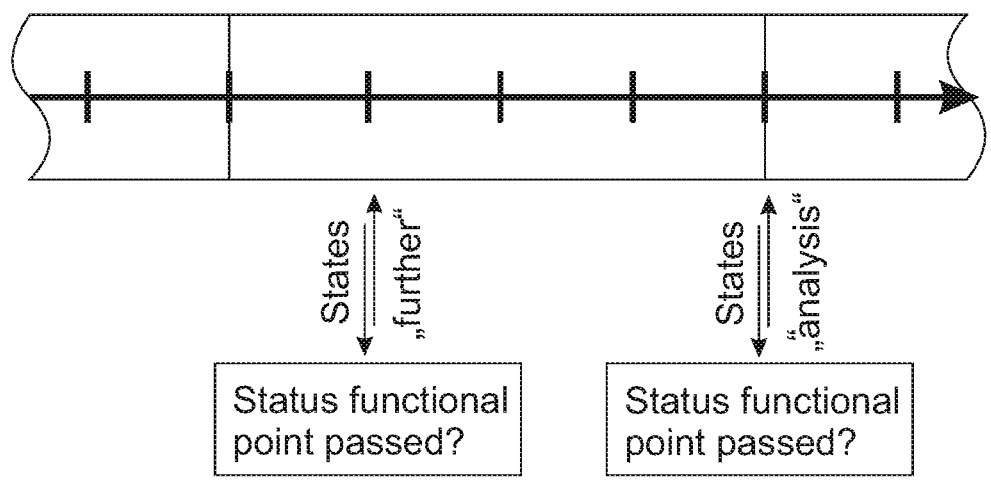

FIG. 9: The start and the end of a respective calculation phase or sub-calculation phase can occur according to the invention for example as follows: before/during/after each time step, at regular intervals, or on the basis of a defined function, the status of the process is analyzed. For that purpose, it is possible for example to apply a (simple) so-called status functional to at least parts of the resulting states, or it is possible to check whether the flow has already passed certain spatial points P of the cavity. In dependence thereon, either the next time step is then simulated ("further", the calculation phase is "prolonged"), or the calculation phase is concluded and the checking operation in accordance with method step (a) is carried out, for example by the quality at least of a part of the previous process being determined ("analysis", the calculation phase is "concluded"). For that purpose, for example, a quality functional can be applied to at least parts of the previously calculated states.

FIG. 10: If a calculation phase was concluded according to the invention, for example, by virtue of the application of a status functional to at least one part of the previous states, it is possible according to the invention to trigger at least four different actions. The simulation is concluded, the calculation phase is repeated (that is to say, the procedure goes back to the start of the current calculation phase again, "repetition"), a previous calculation phase is repeated (that is to say, the process goes back to the start of a previous calculation phase and calculation is further implemented from there, "backwards"), or a subsequent calculation phase is started (mostly the directly following one; that is to say calculation is simply continued, "forwards").

In the case of a repetition, the number N of the time steps and the respective durations Δt of the repeated calculation phase can generally but does not necessarily have to vary. Also, the conditions and the process parameters (including the input parameters) can generally change but only to such an extent that, when the method is concluded, the result is a continuous process corresponding to the original demands.

Which of the various actions is actually triggered is decided by an optimization system which analyzes at least parts of previous states. For that purpose, reference may be made to quality functional, quality criteria, expert knowledge, optimization methods, modeling methods, databanks or reference progressions. The optimization system also decides about any changes to various conditions (input parameters).

Figure 11:
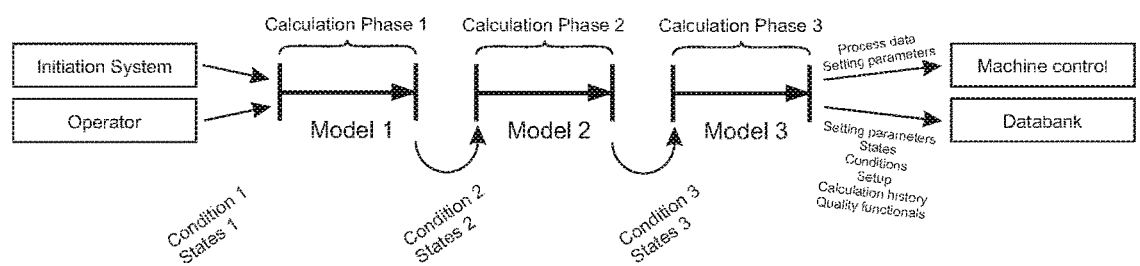

FIG. 11: According to the invention, a plurality of simulations comprising a plurality of calculation phases comprising a plurality of time steps can be (automatically) linked together. For example, a first calculation phase can represent plasticization, a second calculation phase the injection operation, and a third calculation phase the post-pressure operation. Each individual calculation phase can be based on a respectively different process model whereby the respective deciding physical phenomena which occur are described in the best possible fashion, in contrast non-essential phenomena remain disregarded and available computing resources can be used to the best possible extent.

The respectively necessary conditions of the process and the corresponding respective states of the process are passed from one calculation phase to the next calculation phase. Initially, the conditions and the necessary states are provided by an operator and/or by an initiation system. After conclusion of the simulation, input parameters are passed to a machine control system for operating an injection molding machine and various data are stored in a databank for future use in the same or in other calculation scenarios.

FIG. 12: Inline optimizer corresponding to the method according to the invention.

The invention claimed is:

1. A method of simulating a shaping process or a sub-process of the shaping process, wherein states of objects involved in the shaping process, in particular a shaping machine, a shaping tool and/or a material to be processed, are calculated in discrete and successive time steps with presetting of conditions, wherein the conditions represent input parameters of the shaping process, said method comprising:
performing a simulated shaping process or a simulated sub-process of a shaping process;
after a time step which is before the end of the simulated shaping process or the simulated sub-process of the shaping process, performing a check on the calculated states of the objects involved in the shaping process based on at least one quality criterion,
if the check shows that the at least one quality criterion is not met performing at least one of the following further operations:
(i) resumption of the simulation with repeated calculation of the time step and/or a preceding time step, and
(ii) continuation of the simulation with calculation of a time step following the time step, and
when at least one of the further operations is performed, at least partially altering the conditions.

2. The method as set forth in claim 1, wherein the check is performed by applying at least one quality functional to the calculated states.

3. The method as set forth in claim 1, wherein the check, the at least one of the further operations, and the at least partially altering of the conditions are carried out a plurality of times in the context of the performing of the simulated shaping process or the simulated sub-process of the shaping process.

4. The method as set forth in claim 1, wherein the at least one of the further operations are carried out in automated fashion.

5. The method as set forth in claim 1, wherein the performing of the simulated shaping process or the simulated sub-process of the shaping process is subdivided into calculation phases, wherein the calculation phases respectively include a plurality of time steps.

6. The method as set forth in claim 5, wherein the simulated sub-process of the shaping process and/or the calculation phases are respectively given by a start time and an end time.

7. The method as set forth in claim 6 for simulating an injection molding process, wherein the start time and/or the end time of the sub-process and/or of the calculation phases is given by at least one of the following:
beginning and/or end of a plasticization operation,
beginning and/or end of a compression relief,
beginning and/or end of the flow of a plastic melt from a screw pre-chamber in the direction of a tool cavity,
beginning and/or end of a flow of a plastic melt into the tool cavity,
reaching a predetermined filling degree of a tool cavity,
beginning and/or end of a compression phase,
reaching a sealing point,
reaching a switching-over point,
beginning and/or end of a post-pressure phase,
edge layers of a molded part are hardened to such an extent that the molded part is substantially stable in shape,
beginning and/or end of a tool opening movement, and
beginning and/or end of a formative phase.

8. The method as set forth in claim 6, wherein the start time and/or end time of the calculation phases is established by the passage of a filling front at predetermined spatial points of a tool cavity.

9. The method as set forth in claim 6, wherein at least two of the calculation phases are sequentially linked, wherein results of a previous calculation phase are used as initial data of a following calculation phase.

10. The method as set forth in claim 9, wherein various process models and/or calculation methods are used for different calculation phases.

11. The method as set forth in claim 1, further comprising predetermining at least one reference progression for progressions of states calculated in the performing of the simulated shaping process or the simulated sub-process of the shaping process.

12. The method as set forth in claim 2, wherein the applying of the at least one quality functional includes carrying out a comparison between the at least one reference progression and at least one progression calculated in the simulation.

13. The method as set forth in claim 12, wherein the reference progressions are calculated beforehand.

14. The method as set forth in claim 13, wherein the following operations are carried out in calculation of the reference progressions:
   (A) calculating a desired filling pressure at a point of a gate on the basis of a maximum flow path and an average flow cross-section, and
   (B) determining a linear progression in a pressure from the beginning of an injection operation to the calculated filling pressure at complete filling of the tool cavity.

15. The method as set forth in claim 1, wherein the performing of the simulated shaping process or the simulated sub-process of the shaping process is subdivided into calculation phases, and wherein the simulated shaping process and/or the simulated sub-process of the shaping process, and/or the calculation phases is subdivided into sub-calculation phases, wherein the check, the at least one of the further operations, and the at least partially altering of the conditions are carried out after each sub-calculation phase.

16. The method as set forth in claim 15, further comprising predetermining at least one reference progression for progressions of states calculated in the performing of the simulated shaping process or the simulated sub-process of the shaping process, wherein the conditions after each sub-calculation phase are subjected to an optimization method, wherein the optimization method is configured to:
   adapt progressions of calculated states to the predetermined reference configurations and/or
   alter the conditions so that calculated states of objects involved in the shaping process meet the at least one quality criterion.

17. The method as set forth in claim 1, wherein when the at least one of the further operations is performed, the at least partially altering of the conditions comprises using an expert system for developing a statistical design of experiments.

18. The method as set forth in claim 1, wherein the input parameters represented by the conditions of the simulation are transmitted to an injection molding machine after implementation of the simulation and are used in a real shaping process.

19. The method as set forth in claim 1, wherein, after the simulated shaping process is carried out results of the simulation are stored in a databank.

20. The method as set forth in claim 12, wherein a difference is quantitatively detected between the at least one reference progression and the at least one progression calculated in the simulation.

21. The method as set forth in claim 13, wherein the reference progressions are calculated using an expert system.

22. The method as set forth in claim 19, wherein the databank further contains corresponding process data from real shaping processes and the real process data are correlated with the results of the simulation.

23. The method as set forth in claim 1, wherein the performing of the check on the calculated states of the objects involved in the shaping process is performed before results of the simulated shaping process or the simulated sub-process of the shaping process are output.

* * * * *